United States Patent [19]

Schuricht et al.

[11] 4,262,797

[45] Apr. 21, 1981

[54] RECIPROCATING STORAGE UNIT

[75] Inventors: Henry A. Schuricht, Pontiac; Kenneth F. Scheffer, Ann Arbor, both of Mich.

[73] Assignee: AMSTED Industries Incorporated, Chicago, Ill.

[21] Appl. No.: 903,951

[22] Filed: May 8, 1978

[51] Int. Cl.² ................ B65G 27/02; B65G 25/00; B65G 13/02
[52] U.S. Cl. .................. 198/756; 198/750; 198/778
[58] Field of Search ............ 198/756, 778, 757, 750

[56] References Cited

U.S. PATENT DOCUMENTS

| 2,074,351 | 3/1937 | Zeigler | 198/778 |
| 2,940,587 | 6/1960 | McBean | 198/756 |
| 3,599,782 | 8/1971 | Whitfield | 198/778 |
| 3,667,591 | 6/1972 | Sykes | 198/756 |

Primary Examiner—Robert B. Reeves
Assistant Examiner—Brian Bond
Attorney, Agent, or Firm—John L. Schmitt; Fred P. Kostka; Edward J. Brosius

[57] ABSTRACT

A reciprocating storage unit particularly adapted for moving and storing of component parts used, for example, in mechanical-related apparatus includes a circular body providing a downward low-friction spiral guide path between an upper entrance point and a lower discharge point. A slope of the downward path is such that as parts enter the path, movement will not occur by gravity alone. To obtain movement, the unit reciprocates about its vertical axis which with gravity produces movement of each part in series of intermittent steps. Each part proceeds downward and may be stored in the unit in a damage-resistant manner adjacent to the discharge point for release as required.

2 Claims, 11 Drawing Figures

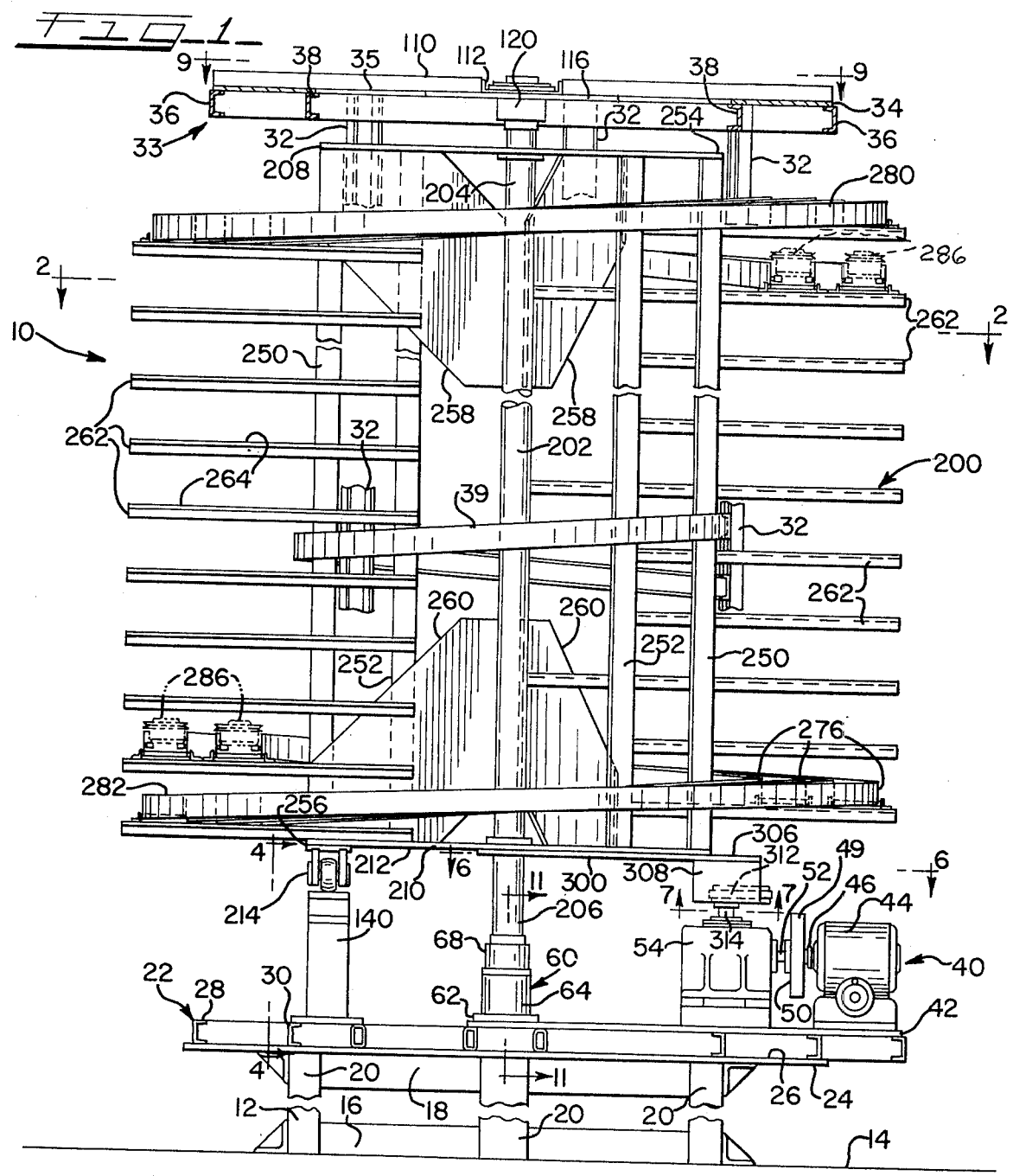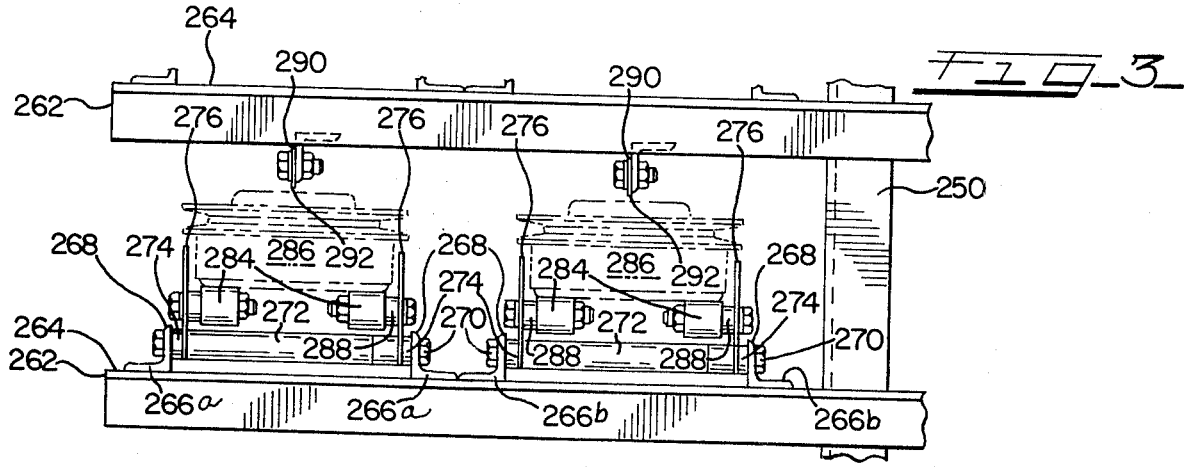

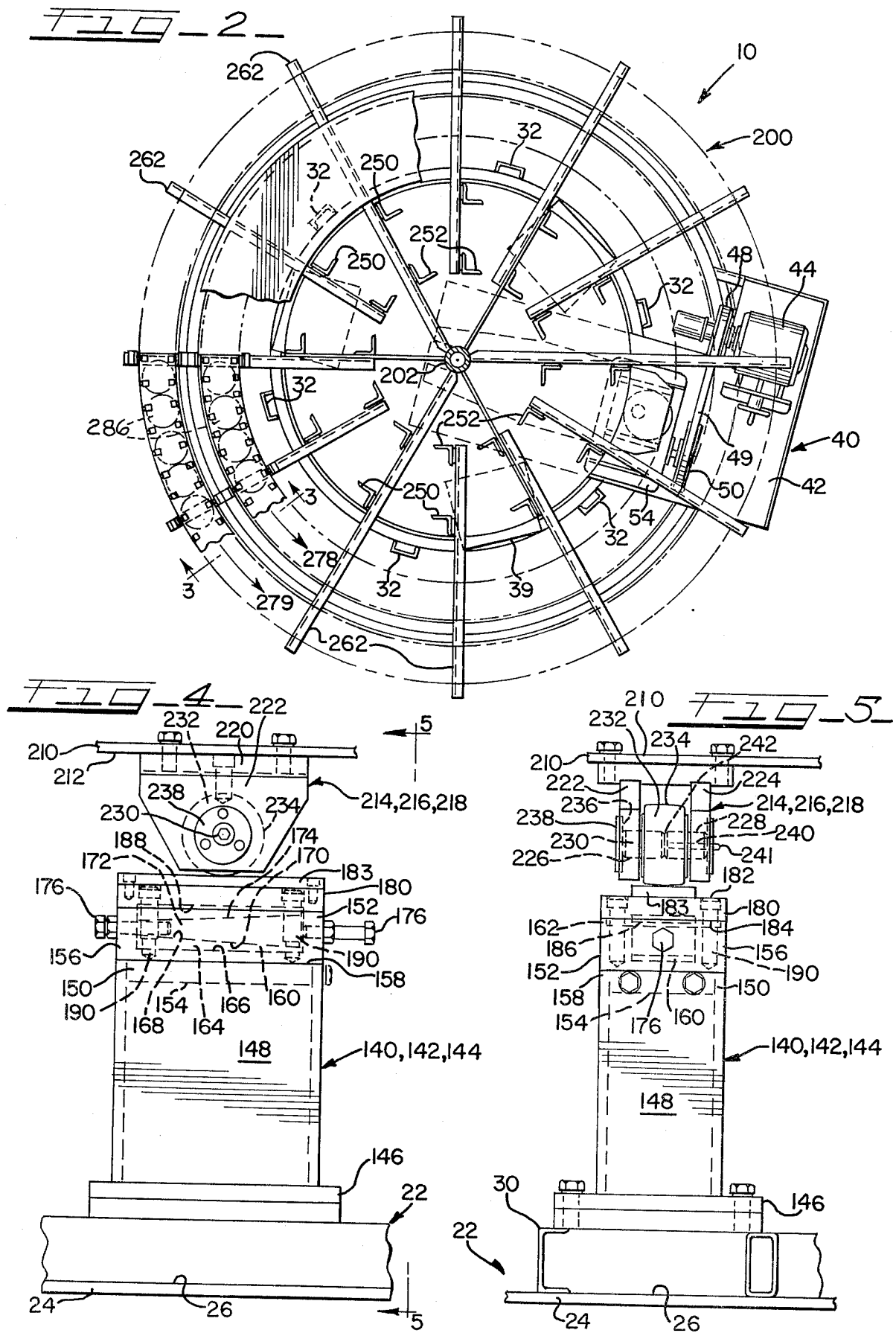

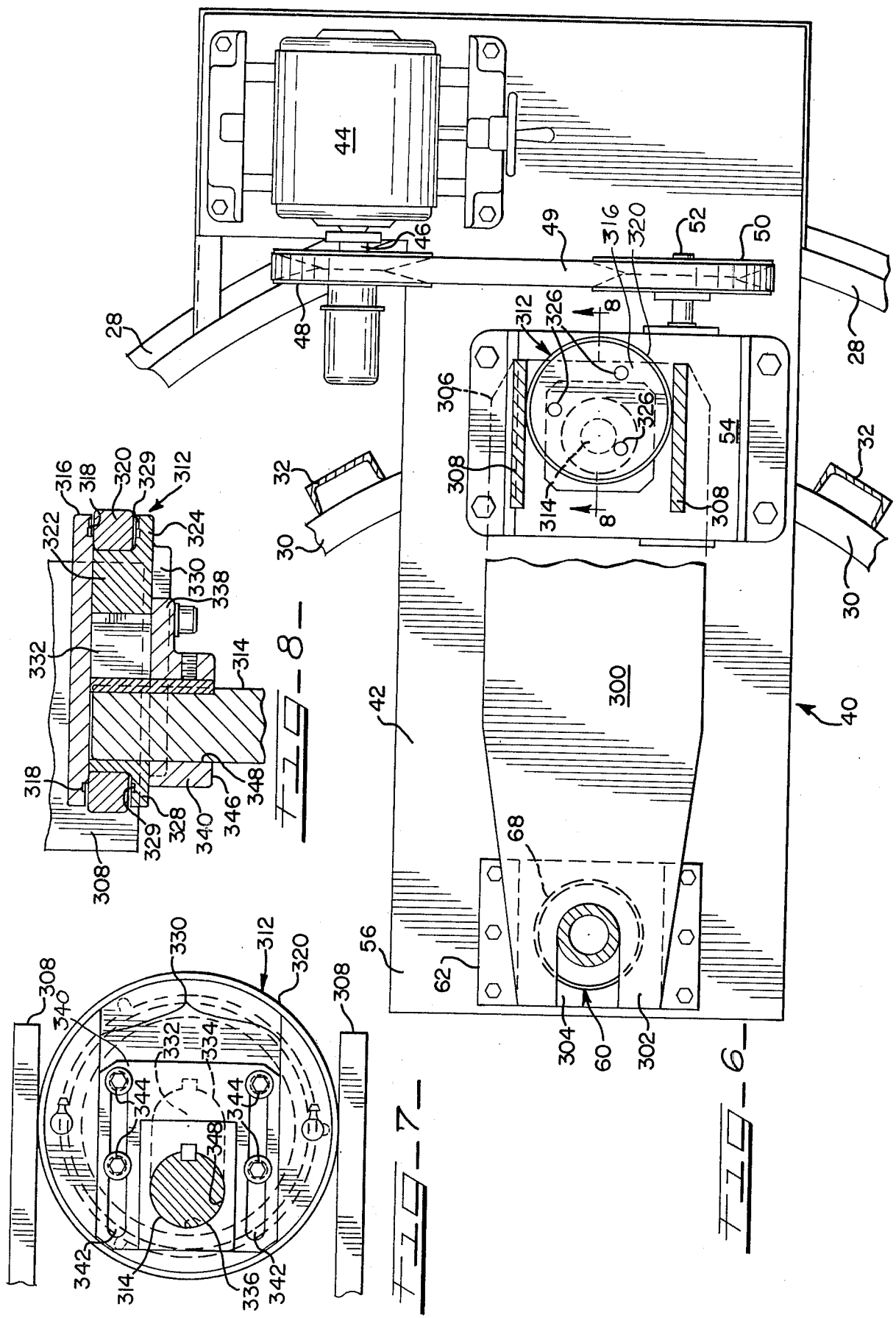

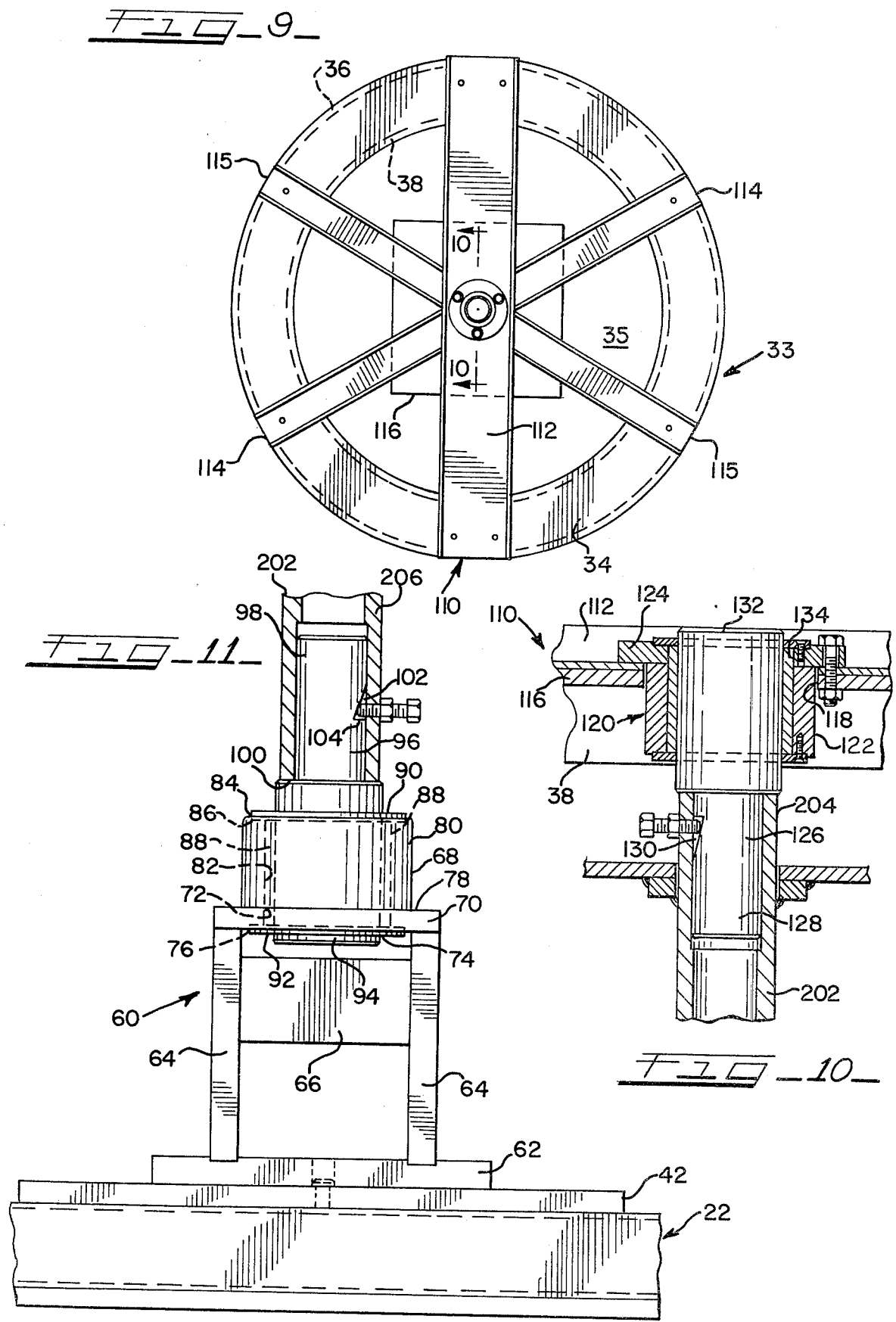

RECIPROCATING STORAGE UNIT

BACKGROUND OF THE INVENTION

1. Field of the Invention

This invention relates to material handling equipment and more particularly to devices which allow for a temporary accumulation of component parts moving from an output of one work station to an input of another downstream work station.

2. Description of the Prior Art

Under modern manufacturing techniques, it is common practice to establish a series of work stations where predetermined, specialized work is performed in a sequential manner on a part in order to transform that part, for example, from a raw material state to a state having a predefined configuration and certain other physical characteristics.

In the like manner, completed parts may be joined to form subassemblies which are subsequently joined with other subassemblies and related parts to form final assemblies. This work may likewise be accomplished sequentially at a number of work stations.

Because the times to perform the work required by a part at particular work stations may vary, temporary storage must be provided to allow for these differing rates of output. Additional means must be provided to transfer completed parts from the output of one work station to an input of a next work station. Differing rates of output per work station also occurs because of equipment failure and worker performance levels.

One common method to accomplish this storage-movement requirement is to place the part completed at one work station on a skid and then move the skid after being sufficiently loaded to the next work station with a fork truck or the like.

A roller conveyor whether driven or undriven likewise provides storage as well as means for ready movement.

Many other types of material handling equipment providing a movement-storage function have been devised to meet the particular conditions which may exist, for example see copending application for patent, Ser. No. 831,228.

SUMMARY OF THE INVENTION

The reciprocating storage unit of this invention contemplates fulfilling a movement-storage function of a material handling system located between successive work stations. This movement-storage function is required because of differences in the output rate of an upstream work station and an input rate of the downstream station connected thereto.

To provide this movement-storage function, the unit has an upper entrance point connected to the output of the upstream work station to receive parts in a sequential manner. The upper entrance point of the unit is connected with a lower discharge point by a downwardly sloped low-friction guide path. The slope and configuration of the guide path is dependent on the configuration of the part and may be conveniently, for example have a counterclockwise spiral configuration, formed about a vertical axis of the unit. A slope of the path is dependent on the frictional interface between the part and the path and is so selected that gravity may produce movement but will not produce continuous movement.

A path formed in part by rollers has been found best for heavier parts while a path having a solid support surface is sufficient for parts which will roll in a particular orientation.

To provide an additional force required to insure part movement, the unit is selectively reciprocated in a direction aligned with the guide path. For example, where the guide path has a downward counterclockwise spiral configuration, the unit is reciprocated about its vertical axis. Each counterclockwise portion of the reciprocation cycle imparts a sufficient force to produce part movement. During a clockwise portion of the reciprocation cycle, the parts remain substantially stationary as the guide path moves beneath the parts. The gravitational force on the parts is sufficient to overcome the frictional engagement between the parts and the guide path and prevents clockwise or upward movement.

The configuration of the reciprocation cycle is also dependent on the configuration of the part. For example, an air cylinder may be used with light-weight parts. On the other hand, a smoother cycle as may be produced with a cam is more desirable for heavier parts.

There are several important advantages of the reciprocation storage unit of this invention over other known devices.

A first advantage is that the unit of this invention provides a large parts storage capacity within a small space without requiring any manual input to accomplish its movement-storage function. This capacity can be easily increased by adding multiple guide paths, for example.

A second advantage is that the unit moves and stores the parts in a near damage-free environment. The slope of the guide path and configuration of the reciprocation cycle are selected with respect to the part configuration to control part velocity and thus minimize damage. Damage potential may be further reduced by proper part orientation to limit part contact to damage-resistant surfaces.

A third important advantage is that the unit also aids in maintaining part separation when those parts tend to shingle or interlock.

A further advantage is that this unit stores parts with a minimum of back pressure. Parts are discharged with a metering device free of the constant stress of heavy back pressure found in a plain gravity storage unit.

Additionally, the unit accomplishes its movement and storage function with a low energy imput since the force required to impart movement need only be of a very low magnitude.

Lastly, the unit may be readily adapted to handle parts of a wide variety of configurations.

DESCRIPTION OF THE DRAWINGS

FIG. 1 is an elevational view in partial section of the reciprocating storage unit of this invention.

FIG. 2 is a plan cross-sectional view taken generally along the line 2—2 of the storage unit of FIG. 1.

FIG. 3 is a detailed elevational cross-sectional view as taken generally along the line 3—3 in FIG. 2 and shows a portion of a dual guide path of the storage unit.

FIG. 4 is a detailed elevation cross-sectional view as taken generally along the line 4—4 of FIG. 1 and shows a bearing support assembly of the storage unit.

FIG. 5 is a detailed elevation cross-sectional view as taken generally along the line 5—5 of the bearing support of FIG. 4.

FIG. 6 is a detailed plan cross-sectional view as taken generally along the line 6—6 of FIG. 1 and shows a drive and adjustable cam reciprocation assembly portion of the storage unit.

FIG. 7 is a detailed bottom cross-sectional view of the cam reciprocation portion taken generally along the line 7—7 of FIG. 1.

FIG. 8 is a detailed elevation cross-sectional view of the cam reciprocation portion taken generally along the line 8—8 of FIG. 6.

FIG. 9 is a detailed plan view taken generally along the line 9—9 of FIG. 1 and shows a spider assembly portion of the storage unit.

FIG. 10 is a detailed elevation cross-sectional view taken generally along the line 10—10 of the spider assembly portion of FIG. 9.

FIG. 11 is a detailed elevation cross-sectional view taken generally along the line 11—11 of FIG. 1 and shows a bottom bearing assembly portion of the storage unit.

DESCRIPTION OF THE PREFERRED EMBODIMENT

As seen in FIG. 1 is a reciprocating storage unit of this invention which is shown generally and designated 10.

The storage unit 10 includes a support stand 12 adapted to be attached to a floor 14 or other like support surface. The support stand 12 has a square configuration and further includes a lower framework 16 and an upper framework 18 separated by uprights 20. The support stand 12 may be conveniently made from structural angles and mechanical tubing.

The upper framework 18 of the support stand 12 in turn carries a lower frame assembly portion 22 comprising a circular-shaped base plate 24. On a top surface 26 of the base plate 24 is an outer and inner lower channel ring 28, 30. Connected to the inner channel ring 30 are six uprights 32 spaced on 60 degree increments.

Connected to an upper end of the uprights 32 is an upper framework assembly 33 comprising a circular top plate 34 having an inner circular cutout 35. About an outer edge of the plate 34 and inner edge of cutout 35 and connected to an underside of the plate 34 is an upper outer and inner channel ring 36, 38. The inner channel ring 38 is likewise fastened to the upper ends of the uprights 32.

To further secure the uprights 32 and add lateral reinforcement thereto, a reinforcing channel 39 rolled in a circular, counterclockwise spiral configuration having a pitch proximating $7\frac{7}{8}$ inches is fastened to an inner side of the uprights 32.

Supported on the outer and inner lower channel rings 28, 30 is a drive assembly portion 40 comprising an L-shaped base plate 42 to which is assembled an electric drive motor 44. A drive shaft 46 of the motor 44 carries a variable speed pulley 48 which connects by a belt 49 to a driven pulley 50 on an input shaft 52 of a gear speed reduction unit 54 also assembled to the base plate 42. The unit 54 has been selected to reduce the rotary output of the motor 44 by a ratio of 40 to 1 which may be more finely adjusted by regulating the variable speed pulley 48. An output from the gear reduction unit 54 between 15 and 45 rpm is desirable.

At an inner end 56 of the base plate 42 is a bottom bearing assembly portion 60 which is aligned with a vertical axis of the unit 10. The bottom bearing assembly portion 60 may be best seen in FIGS. 1 and 11 and includes a bottom support plate 62 to which is assembled two spaced vertical side plates 64. Between the plates 64 is a centrally located space bar 66 which is positioned beneath a bottom bearing block housing 68 which in turn is supported by the two spaced side plates 64.

The bottom bearing block housing 68 includes square-shaped base plate 70 containing a circular aperture 72. About a bottom end 74 of the aperture 72 is a bottom circular recess 76. On a top surface 78 of the base plate 70 is a cylindrical-shaped tube portion 80 having an inner circular aperture 82 aligning with the aperture 72 of the base plate 70. About a top end 84 of the aperture 82 is a top circular recess 86.

Disposed within the aligned apertures 72, 82 is a sleeve bearing 88 maintained therein by a top and bottom retainer ring 90, 92 fastened within the top and the bottom recesses 76, 86. Within the sleeve bearing 88 is a lower portion 94 of a bottom shaft 96 having an upper portion 98 which extends above the tube portion 80. This upper portion 98 of the shaft 96 has a diameter less than the lower portion 94 to form a horizontal shoulder 100 at an interface of the two shaft portions 94, 98. Additionally, the upper portion 98 contains a check-shaped notch 102 defined in part by a bottom horizontal leg 104.

On the top plate 34 of the upper frame assembly 33 is a spider ring portion assembly 110 comprising a channel member 112 having its flange projecting upwardly. Joined to each side at the center of the channel member 112 are two pair of channel bars 114, 115 positioned at a 60 degree angle from the channel member 112. Attached below the channel member 112 and the pairs of channel bars 114, 115 is a square center plate 116. Through the plate 116 and channel member 112 is a circular aperture 118 aligned with the vertical axis of the unit 10.

Disposed in the aperture 118 is a top bearing assembly portion 120 which includes a top bearing block housing 122 of similar construction as the bottom bearing block housing 68 but which is rotated 180 degrees so that the base plate 70 of the housing 68 becomes a top plate 124 which rests on the spider ring assembly portion 110 and is supported thereby. The top bearing assembly 120 includes a top shaft 126 having a lower portion 128 extending beneath the spider ring assembly portion 110 and which includes a like triangular-shaped notch 130 as the shaft 96. An upper portion 132 of the top shaft 126 is journaled in a sleeve bearing 134 carried by the bearing block housing 122.

Disposed at 120 degree increments about the inner channel ring 30 of the lower frame assembly 22 are three support bearing assemblies 140, 142 and 144.

Each support bearing assembly, which is shown in detail in FIGS. 4 and 5, includes a base 146 carried in part by the inner channel rings 30 and which in turn connects with an upwardly extending tube support portion 148. Positioned within a top end 150 of the tube support portion 148 is a bottom retainer plate 152 having a bottom insert portion 154 which is disposed within the tube support portion 148 while an upper portion 156 of the bottom retainer plate 152 rests on a top edge 158 of the tube support portion 148.

Within the upper portion 156 of the bottom retainer plate 152 is an elongated cutout 160 having a rectangular-shaped recess 162 formed about its upper edge. Within the cutout 160 of the bottom retainer plate 152 is a taper plate 164 having a flat bottom surface 166 and a top inclined surface 168 formed with a 3 degree pitch. Interfacing with the top surface 168 of the taper plate 164 is a bottom surface 170 of a rectangular-shaped V-block 172. Both the bottom surface 170 and a top surface 174 of the V-block 170 are pitched at 3 degrees and positioned to converge toward one end. An adjustment bolt 176 carried one each by the bottom retainer plate 152 at each end allows the longitudinal position of the upper V-block 172 to be adjusted within the cutout 160 of the bottom retainer plate 152.

Assembled to the bottom retainer plate 152 is a top retainer plate 180 having a flat upper surface 182 to which is affixed a hardened wear plate 183. Offset inwardly from and about a periphery of a lower surface 184 of the top retainer plate 180 is a centering rib 186 which fits within the recess 162 of the cutout 160 of the bottom retainer plate 152 and respectively aligns with the two plates 152, 180.

A lower surface 188 of the centering rib 186 of top retainer plate 180 abuts with the V-block 172 and by regulation of the bolts 176, the elevation of each wear plate 183 of the support bearing assemblies 140, 142 and 144 may be adjusted to proximately equal heights. Once the height of the wear plates 183 has been so adjusted, each top retainer plate 180 may be secured to the respective bottom plate 152 of the support bearing assemblies 140, 142 and 144 by means of four bolts 190.

The three bearing support assemblies 140, 142 and 144 support a drum assembly portion 200. The drum assembly 200 includes a hollow cylindrical-shaped support column 202 having a top and bottom end 204, 206 which in turn receives the lower portion 128 of the top shaft 126 and the upper portion 98 of the bottom shaft 96.

Adjacent to and just below the top end 204 of the column 202 is a flat circular top plate 208 while adjacent to and just above the bottom end of the column 202 is a like flat circular bottom plate 210.

Fastened to an underside 212 of the bottom plate 210 and spaced at 120 degree intervals are three roller bearing assemblies 214, 216 and 218 so positioned to align with the three bearing support assemblies 140, 142 and 144.

Each of the roller bearing support assemblies 214, 216 and 218 includes a support block 220 which is affixed to the underside 212 of the bottom plate 210. Extending downwardly from the block 220 are spaced inner and outer shaft plates 222, 224 in which are formed transverse apertures 226, 228. Carried within the apertures 226, 228 is a shaft 230 which is keyed to the outer plate 224 so as to prevent rotational movement. On the shaft 230 and between the plates 222, 224 is a roller bearing 232 having a crowned outer surface 234.

The outer surface 234 of each bearing 232 is in rolling contact with the wear plate 183 of each respective support bearing assembly 140, 142 and 144 and supports the drum assembly portion 200 thereabove. Note that it may be necessary to further adjust the height of each wear plate 182 so that each of the three support bearing assemblies 140, 142 and 144 carries an equal load.

To prevent lateral movement of the shaft 230, a circular recess 236 is formed about an outer end of each aperture 226, 228 and in which is disposed a removable cover plate 238.

To provide for lubrication of the roller bearings 232, each shaft 230 is formed having a centrally located longitudinal passage 240 having an open outer end fitted with a grease fitting 241. An inner end of the passageway 240 communicates with a peripheral groove 242 in the shaft 230 allowing lubricant to move from the fitting 241 to the groove 242 which lies adjacent to an inner middle part of the bearing 232.

The drum assembly 200 further includes an outer and inner row of angle uprights 250, 252. The rows 250, 252 comprise individual angles positioned in a circular array and spaced on 30 degree increments. The outer row 250 is aligned with an outer edge 254, 256 of the top and the bottom plate 208, 210 while the inner row 252 is located proximately one-half of the distance between the outer edges 254, 256 of the plates 208, 210 and the center column 202. The angles of each row are radially aligned.

To stiffen the drum assembly 200, a top and a bottom set 258, 260 of three gussets with each gusset spaced at 120 degree increments connected with the center column 202 and the top and the bottom plate 208, 210 respectively.

Note that the uprights 32 connecting the base plate 24 to the top plate 34 are positioned adjacent to the outer edge 254, 256 of the top and the bottom plates 208, 210 and in between adjacent angle uprights of the outer row 250 of the drum assembly portion 200.

Attached to radially aligning angle uprights of the outer and inner rows 250, 252 is a plurality of angle arms 262 so positioned to provide a horizontal top flange 264. The angle arms 262 are so located vertically to create a spiral path having a counterclockwise downward pitch proximately $7\frac{7}{8}$ inches per revolution. Because there are 12 angle uprights in each row 250, 252, laterally adjacent angle arms are elevationally spaced at a distance proximating 21/32 inch.

Note that the pitch of the reinforcing channel 39 attached to the uprights 32 is the same as that of the arms 262 so that the channel 39 may be positioned vertically midway between vertically adjacent angle arms 262.

Attached on the top flange 264 of the angle arms 262 is a pair of horizontally spaced angle chips 266 so positioned that a vertical flange 268 of each clip 266 is opposite and opposing. The number of clip pairs may be varied from storage unit to storage unit and in the embodiment shown there are two pairs of angle clips 266, an outer pair 266a and an inner pair 266b.

Each pair of angle clips 266a, 266b supports therebetween a bolt 270 which in turn carries an elongated inner spacer portion 272 bounded on each side by outer spacer portions 274. Between the inner portion 272 and the two outer portions 274 are spaced guide plates 276 each formed with a downward spiral configuration so as to define downward spiral guide paths 278, 279 as denoted by the arrows in FIG. 2, between a top entrance point 280 and a bottom discharge point 282.

Projecting inwardly from each of the guide plates 276 is a plurality of roller bearings 284 forming a support surface for a part 286 which as noted earlier may be a component of a mechanical related assembly. Each roller bearing 284 is separated from its respective plate 276 by a spacer 288. The lateral spacing of the rollers 284 is selected so as to provide smooth support surface for the parts 286 while the lateral spacing of the guide plates 276 is such to provide proximately 1/16 inch clearance between sides of the object 286 and the plates 276.

Positioned above each of the guide paths 278 and midway between the plates 276 is a continuous retainer strip 290 attached to a bottom side of the laterally adjacent angle arms 262. A bottom edge 292 of the strip 290 is selectively positioned proximately ⅛ inch above a top of the part 286 to prevent vertical dislocation of the parts 286 from the guide paths 278, 279.

The drum assembly portion 200 of the storage unit 10 is reciprocated about its vertical axis by an elongated reciprocating arm 300 attached to the underside 212 of the bottom plate 210 of the drum assembly portion 200. An inner end 302 of the arm 300 contains a yoke-shaped slot 304 which fits about the column 202 while an outer end 306 of the arm 300 extends beyond the outer edge 256 of the bottom plate 210. The outer end 306 of the arm 300 carries two spaced downwardly projecting guide plates 308 positioned on each side of and parallel to a longitudinal axis of the arm 300.

Disposed between the guide plates 308 is an adjustable cam assembly portion 312 which is prepared for attachment to an output shaft 314 of the speed reduction unit 54 and may provide a reciprocating cycle of varying magnitude.

The cam assembly 312 includes a circular-shaped upper retainer plate 316 having an inner peripheral lubrication groove 318. The upper retainer plate 316 fits over a bearing 320 having a diameter greater than that of the retainer plate 316 and proximately equal to but less than a distance between guide plates 308 on the arm 300.

Disposed within the bearing 320 is an upper circular portion 322 of a bearing hub 324 which is secured to the upper retainer plate 316 by bolts 326. A lower portion 328 of the bearing hub 324 has a diameter greater than the upper portion 322 and proximating a diameter of the upper retainer plate 316. Like the upper retainer plate 316, the lower portion 328 of the hub 326 has a peripheral lubrication groove 329.

With the lower portion 328 of the bearing hub 324 is a horizontal slot 330. Aligned with a center of the slot 330 is an elongated vertical aperture 332 having radiused inner and outer ends 334, 336 with an axis of the inner end 334 aligned with a vertical axis of the cam assembly portion 312. The distance between axes of the radiused ends 334, 336 proximates 1½ inches.

Slidably attached to the hub 224 and located within the slot 330 is an upper rectangular portion 338 of a cam slide plate 340. The upper portion 338 of the plate 340 contains two spaced slots 342 to receive bolts 344 which in turn are threadedly secured to the hub 324. Between the slots 342 and connecting to the upper portion 338 is a downward projecting lower portion 346 in which is formed a keyed circular aperture 348 which extends through the upper portion 338.

The output shaft 314 of the gear reduction unit 54 is disposed within the aperture 348 and extends upwardly into the elongated aperture 332 of the hub 324. By adjusting the position of the cam slide plate 340 with respect to the bearing hub 324, the bearing 320 may be moved to an eccentric position of a maximum of 1½ inches to create a reciprocating stroke of 3 inches.

During operation of the storage unit 10, the parts 286 may be conveniently moved to the entrance point 280 of the unit 10 from the output of an upstream work station by a conventional conveying device. The parts 286 enter at the point 280 in a sequential manner. In the embodiment disclosed above, the unit 10 has two guide paths 278, 279 and therefore would be connected to two streams of incoming parts 286.

As was noted earlier, the downward slope or pitch of each guide path 278, 279 has been so selected with respect to the frictional resistance between the guide path 278, 279 and the parts 286 that continuous downward movement will not occur. Under these conditions, the component force of gravity inducing movement may be proximately equal to but always just less than the average of the frictional forces impeding movement.

To cause movement of the parts 286 from the entrance point 280 to the discharge point 282, the unit 10 is reciprocated about its vertical axis. The configuration of the reciprocation cycle is determined by the difference between the gravity force inducing movement and the frictional force impeding movement. Where the part 286 has a relatively lighter weight, the difference between the two forces must be increased. Therefore, the force imparted by the reciprocation cycle must be increased such that when added to the gravitational force, the sum of such exceeds the frictional forces. Under these conditions, an air cylinder type device produces a satisfactory reciprocation cycle.

Where the part 286 is of a relatively heavier weight, a smoother and more gentle reciprocation cycle is desired and may be produced by the cam assembly portion 312 described in detail. Note that the configuration of the reciprocation cycle produced by the cam assembly portion 312 may be ajusted by regulation of the variable speed pulley 48 connected to the motor 48 to adjust rpm output and by regulation of the position of the cam slide plate 340 with respect to the cam hub 324 to adjust the magnitude of the cycle.

Because the guide paths 278 have a downward counter-clockwise orientation, during a counterclockwise portion of the reciprocation cycle the parts 286 are impelled in a counterclockwise and downward direction. This impelling force with the force of gravity is sufficient to cause the part to move a short but undefinable distance. During a clockwise portion of the reciprocation cycle, the parts 286 remain substantially stationary as the guide paths 278, 279 are drawn under the parts 286. Thus, each portion of the reciprocation cycle may result in movement of the parts 286 with respect to the guide paths 278.

As the unit 10 continues to reciprocate, parts are stepped down the guide path 278, 279 and may accumulate adjacent to the discharge point 282 by a stop 350 (not shown) which prevents further movement. This accumulation may continue until both guide paths 278 are full of parts 286.

By selective removal of the stop 350, the parts 286 may be fed to an input of a downstream work station as demand requires.

There is little to no relative movement of the parts 286 accumulated adjacent to the stop 350. The stop 350 prevents continued downward movement while the frictional forces between the guide paths 278, 279 and the parts 286 is not sufficient to cause relative movement therebetween in this packed condition. Because of the lack of relative movement, any opportunity for damage is greatly reduced.

While various modifications may be suggested by those versed in the art, it should be understood that we wish to embody within the scope of the patent warranted hereon, all such modifications as reasonably and properly come within the scope of our contribution to the art.

What is claimed is:

1. A storage unit particularly adapted for use in a material handling system located between a first and second work station, said unit comprising, a support frame, drive means carried by said frame and including an eccentric camming means to produce a reciprocation movement, a plurality of support bearing assemblies carried in a circular array by said support frame, each said assembly having a flat upper support surface elevationally adjustable to allow said upper support surface to be positioned proximately aligned in a horizontal plane, an elongated vertical shaft having a lower end rotatively carried by said support frame, a storage structure having a cylindrical configuration, said structure supported by said shaft and having a cam guide means operatively connected to said camming means, a plurality of roller means carried on an underside of a lower plate of said storage structure, said means aligned with said plurality of said support bearing assemblies respectively and supportively engaged by such, and a spiral-shaped guide path carried within said storage structure and defined by spaced sidewalls and roller means projecting inwardly from each said sidewall to form a supportive and near friction-free base, said guide path having an upper entrance to receive said parts and a lower discharge point for discharging said parts, said guide path being selectively downward sloped to impart a slight near constant gravitational moving force on said parts to promote movement of said parts between said entrance point and said discharge point, said slope of said path being insufficient to impart sustained independent movement of said parts, wherein said drive means reciprocates said storage structure and said guide path to impart to said parts a moving force where when combined with said gravitational moving force causes movement of said parts from said inlet point for accumulation in a damage-resistant manner adjacent to said discharge point for selective release to said second work station.

2. A reciprocating storage unit comprising, a base, a stationary frame supported by said base and including a bottom support plate, a series of uprights carried by said bottom support plate in a circular array and a top support plate including a spider ring assembly portion connected to upper ends of said uprights, an upper and lower bearing assembly carried respectively by said bottom support plate and said top support respectively, a plurality of support bearing assemblies carried in a circular array by said bottom support plate of said stationary frame, each said assembly having a flat upper support surface elevationally adjustable to allow said upper support surface to be positioned at proximately equal heights, a drum assembly portion comprising, a vertical shaft having its upper and lower ends rotatively carried in upper and lower shaft bearing assemblies respectively, a horizontal circular upper and lower plate carried by said shaft adjacent to said upper and lower ends of said shaft, a first outer row of spaced angle uprights positioned between said plates and adjacent to an outer peripheral edge of each plate, a second inner row of spaced angles positioned between said upper and lower plates proximately midway between said outer edge and said vertical shaft, said angles of said second inner row radially aligned with said angle of said first outer row, a plurality of roller means carried by an underside of said lower plate, said means aligned with said plurality of said support bearing assemblies respectively and supportively engaged by such, an elongated reciprocating arm carried by said lower plate, said arm having an outer end formed having two downward extending spaced plates, a plurality of spaced horizontal arms carried by said angle uprights in a radially disposed array, adjacent arms being elevationally offset to create a downward spiral support having a selective downward pitch, and guide means carried by said spaced horizontal arms comprising spaced vertical side plates and a plurality of rollers extending inwardly from said side plates to provide a near friction-free support surface, said means having an upper end forming an entrance point and a lower end forming a discharge point, and reciprocating means carried by said bottom plate of said stationary frame and including, a drive motor, a gear reduction unit connected to an output of said drive motor through a speed regulating device, an adjustable cam means including a horizontally disposed bearing having an outer race positioned between said spaced plates of said reciprocating arm, an upper and lower retainer plate positioned on each side of said bearing, and cam slide plates slidably attached to a bottom of said lower retainer plate, said slide plate having an aperture receiving therein a vertical output shaft of said gear reduction unit, wherein said aperture in said slide plate may be selectively offset from a vertical axis of said adjustable cam means to produce a reciprocating movement of said drum assembly upon activation of said motor so as to promote downward movement of said parts in an orderly and damage resistant manner.

* * * * *